F. W. GRAEVE & F. W. GRAEVE, Jr.
GRATING APPARATUS.
No. 173,941. Patented Feb. 22, 1876.
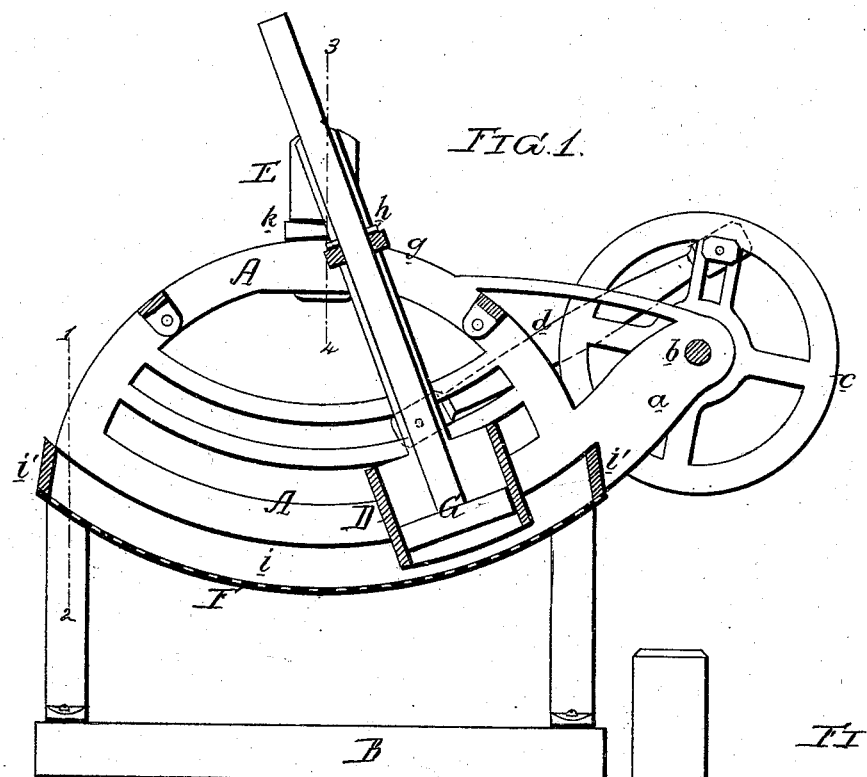

UNITED STATES PATENT OFFICE.

FREDERICK W. GRAEVE AND FREDERICK W. GRAEVE, JR., OF PHILADELPHIA, PA., ASSIGNORS TO FREDERICK W. GRAEVE, OF SAME PLACE.

IMPROVEMENT IN GRATING APPARATUS.

Specification forming part of Letters Patent No. 173,941, dated February 22, 1876; application filed September 7, 1875.

*To all whom it may concern:*

Be it known that we, FREDERICK W. GRAEVE and FREDERICK W. GRAEVE, Jr., of Philadelphia, Pennsylvania, have invented certain Improvements in Grating Apparatus, of which the following is a specification:

The object of our invention is to construct a machine for rapidly and thoroughly grating almonds and other nuts; and this object we attain in the manner which we will now proceed to describe, reference being had to the accompanying drawing, in which—

Figure 1 is a vertical section of our improved grating apparatus; Fig. 2, a section on the line 1 2; and Fig. 3, a section on the line 3 4, with the adjustable parts in a different position.

A A are the opposite side frames of the apparatus, secured to a suitable base, B, and provided at one end with arms $a$, in which are formed bearings for a driving-shaft, $b$, carrying a crank-wheel, $c$. This wheel is connected by means of a rod, $d$, to a pin, $e$, which passes through a curved slot in one of the side frames, and is attached to one of the side arms $f$ of a receptacle, D, in which are placed the nuts to be grated. The upper ends of the arms $f$ are pivoted to adjustable frames E, which are secured to the side frames A in the manner described hereafter, the pivots being so arranged in respect to the receptacle D that the lower edge of the same shall vibrate in the arc of a circle concentric with the segmental grating-bed F, the latter being, in the present instance, composed of a sheet-metal plate, perforated and roughened like that of any ordinary grater. The grating-bed is secured to a frame consisting of curved side strips $i$ and end strips $i'$, and this frame is secured to the side frames A by means of screws $j$, (see Fig. 2,) so that it can be readily removed and replaced by a grating-bed differently constructed for coarser or finer grating. The kernels of the nuts in the receptacle D are maintained in proper contact with the grating-bed by a weighted plunger, G, the stem of which slides in and is guided by a slot in the transverse strip $g$, a pin, $h$, extending through the said stem, and serving to prevent the lower face of the plunger from coming in contact with the grating-surface.

In order to compensate for differences in the height of the teeth of the grating-bed F, caused by wear or otherwise, the edges of the frames E, to which the receptacle D is pivoted, are adapted to guides on the side frames A, and the upper portions of the frames E project inward over the upper edges of the side frames, between which and the said projecting portions are inserted wedge-shaped blocks $k$, by adjusting which the frames E, and, consequently, the receptacle D which they carry, can be raised or lowered at pleasure, being secured after adjustment by set-screws $m$.

By the above-described apparatus we are enabled to reduce to a comparatively fine powder almonds and other nuts, which have hitherto been reduced by pounding in a mortar, a plan which is objectionable, because when so treated the nuts, owing to their oily nature, form a pasty mass unfit for many uses to which the nuts are applied by confectioners and others.

It will be evident that other modes of vibrating the receptacle D may be adopted in place of the devices shown, although we prefer this method on account of its effectiveness and simplicity.

We claim as our invention—

1. The combination of the removable segmental grating-bed F with the receptacle D, pivoted to the side frames of the machine, and provided with a weighted and guided plunger, G, as and for the purpose set forth.

2. The combination of the receptacle D with the guide frames E, wedge-shaped blocks $k$, and set-screws $m$, arranged in respect to the side frames A A as set forth.

In testimony whereof we have signed our names to this specification in the presence of two subscribing witnesses.

F. W. GRAEVE.
F. W. GRAEVE, JR.

Witnesses:
HUBERT HOWSON,
HARRY SMITH.